United States Patent
Kondo et al.

(10) Patent No.: US 6,323,905 B1
(45) Date of Patent: Nov. 27, 2001

(54) PICTURE CONVERSION APPARATUS PICTURE CONVERSION METHOD LEARNING APPARATUS AND LEARNING METHOD

(75) Inventors: Tetsujiro Kondo; Takayoshi Fujiwara; Yuuji Okumura, all of Kanagawa; Yasunobu Node, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/218,526

(22) Filed: Dec. 22, 1998

(30) Foreign Application Priority Data

Dec. 25, 1997 (JP) .................................................. 9-357622

(51) Int. Cl.$^7$ .................................................. H04N 7/01
(52) U.S. Cl. .................. 348/441; 348/458; 348/581; 375/240.02; 382/224
(58) Field of Search ................................. 348/441, 448, 348/458, 459, 581, 421.1, 420.1; 375/240.12, 240.02, 240.01, 240.27, 240.05; 382/298, 299, 300, 224; H04N 7/01

(56) References Cited

U.S. PATENT DOCUMENTS

| | | | |
|---|---|---|---|
| 5,469,216 | * 11/1995 | Takahashi et al. | 348/441 |
| 5,663,764 | * 9/1997 | Kondo et al. | 348/414 |
| 5,666,164 | * 9/1997 | Kondo et al. | 348/441 |
| 5,852,470 | * 12/1998 | Kondo et al. | 348/448 |
| 5,940,132 | 8/1999 | Kondo et al. | 348/441 |
| 5,946,044 | 8/1999 | Kondo et al. | 348/458 |
| 6,134,348 | * 10/2000 | Nakaya et al. | 382/224 |
| 6,192,076 | * 2/2001 | Kondo | 375/240.12 |
| 6,198,770 | * 3/2001 | Kondo | 375/240.14 |

* cited by examiner

Primary Examiner—Michael Lee
Assistant Examiner—Jean W. Désir
(74) Attorney, Agent, or Firm—Frommer Lawrence & Haug LLP; William S. Frommer; Joe H. Shallenburger

(57) ABSTRACT

An apparatus for converting a first picture comprising pixels into a second picture comprising pixels is provided. The second picture is converted by executing on the first picture an adaptive process that determines prediction values of the second picture by using a number of pixel values of the first picture as prediction taps and a number of prediction coefficients that are adapted to the first picture. The apparatus comprises a prediction taps forming circuit for forming a number of prediction taps from the first picture and a picture obtained by the adaptive process and an executing circuit for executing the adaptive process by using the formed number of prediction taps and a number of prediction coefficients that are adapted to the prediction taps. The apparatus further comprises a class taps forming circuit for forming a number of class taps from the first picture and the picture obtained by the adaptive process. The apparatus further comprises a classifying circuit for classifying the number of class taps to determine a class. The executing circuit executes the adaptive process by using the formed number of prediction taps and the number of prediction coefficients corresponding to the class.

24 Claims, 12 Drawing Sheets

IMAGE CONVERSION APPARATUS

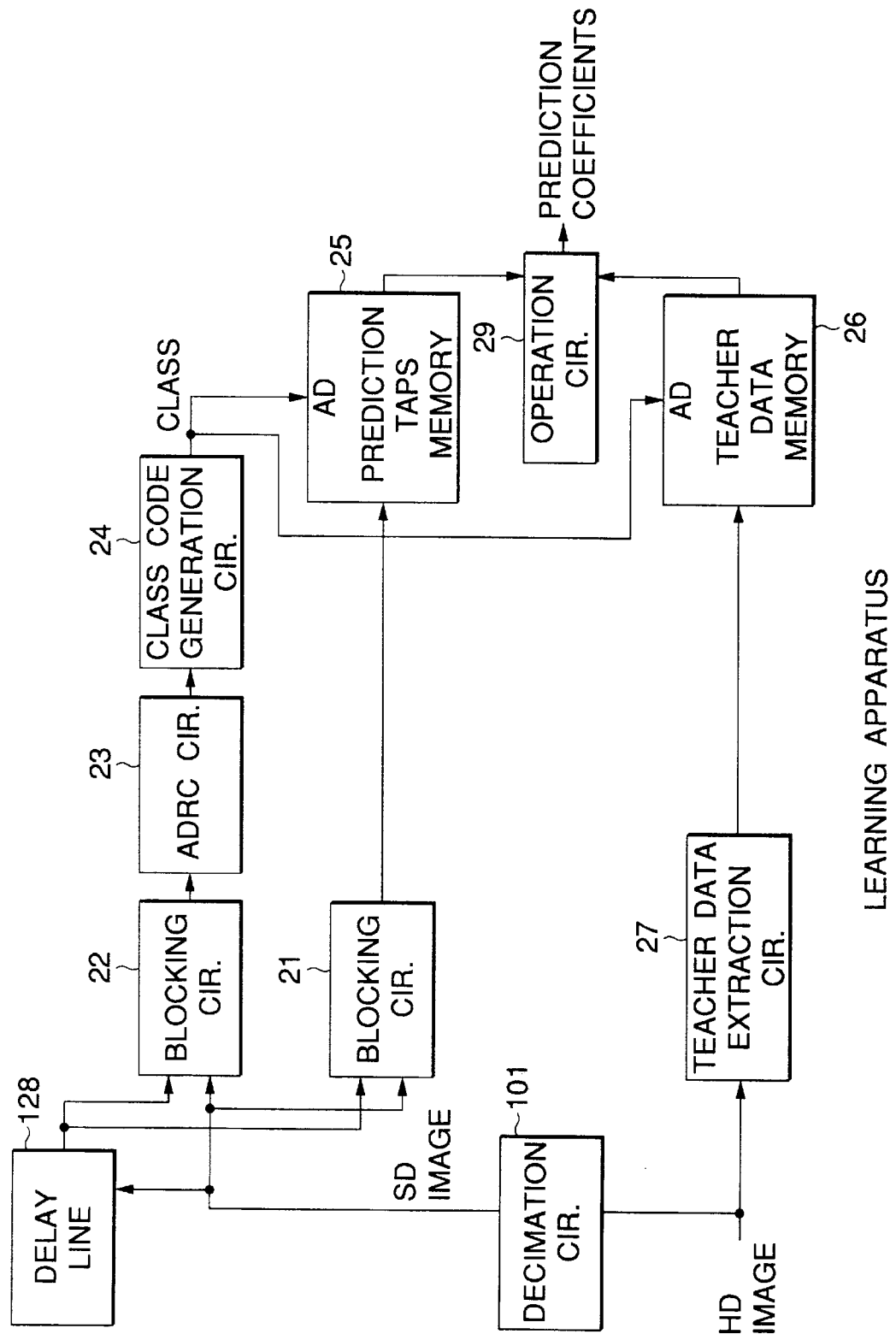

PICTURE CONVERSION APPARATUS PICTURE CONVERSION METHOD LEARNING APPARATUS AND LEARNING METHOD

BACKGROUND OF THE INVENTION

The present invention relates to a picture conversion apparatus and a picture conversion method. In particular, the invention relates to a picture conversion apparatus and a picture conversion method which makes it possible to obtain a picture having better picture quality.

In converting a standard-resolution or low-resolution picture (hereinafter referred to as an SD (standard definition) picture where appropriate) into a high-resolution picture (hereinafter-referred to as an HD (high definition) picture where appropriate), or in enlarging a picture, pixel values of absent pixels are interpolated (compensated for) by using what is called an interpolation filter or the like.

However, even if pixels are interpolated by using an interpolation filter, it is difficult to obtain a high-resolution picture because HD picture components (high-frequency components) that are not included in an SD picture cannot be restored.

In view of the above, the present applicant previously proposed a picture conversion apparatus which converts an SD picture into an HD picture including high-frequency components that are not included in the SD picture.

In this picture conversion apparatus, high-frequency components that are not included in an SD picture are restored by executing an adaptive process for determining a prediction value of a pixel of an HD picture by a linear combination of the SD picture and predetermined prediction coefficients.

Specifically, for instance, consider the case of determining a prediction value $E[y]$ of a pixel value $y$ of a pixel (hereinafter referred to as an HD pixel where appropriate) constituting an HD picture by using a linear first-order combination model that is prescribed by linear combinations of pixel values (hereinafter referred to as learning data where appropriate) $x_1, x_2, \ldots$ of a certain number of SD pixels (pixels constituting an SD picture) and predetermined prediction coefficients $w_1, w_2, \ldots$. In this case, a prediction value $E[y]$ can be expressed by the following formula.

$$E[y]=w_1 x_1 + w_2 x_2 + \ldots \tag{1}$$

For generalization, a matrix W that is a set of prediction coefficients w, a matrix X that is a set of learning data, and a matrix Y' that is a set of prediction values $E[y]$ are defined as follows:

$$X = \begin{pmatrix} x_{11} & x_{12} & \cdots & x_{1n} \\ x_{21} & x_{11} & \cdots & x_{2n} \\ \cdots & \cdots & \cdots & \cdots \\ x_{m1} & x_{m2} & \cdots & x_{mn} \end{pmatrix} \tag{2}$$

$$W = \begin{pmatrix} W_1 \\ W_2 \\ \cdots \\ W_N \end{pmatrix}, \quad Y' = \begin{pmatrix} E[y_1] \\ E[y_2] \\ \cdots \\ E[y_m] \end{pmatrix}$$

The following observation equation holds:

$$XW=Y' \tag{3}$$

Consider the case of determining prediction values $E[y]$ that are close to pixel values y of HD pixels by applying a least squared method to this observation equation. In this case, a matrix Y that is a set of true pixel values y of HD pixels as teacher data and a matrix E that is a set of residuals e of prediction values $E[y]$ with respect to the pixel values y of the HD pixels are defined as follows:

$$E = \begin{pmatrix} e_1 \\ e_2 \\ \cdots \\ e_m \end{pmatrix}, \quad Y' = \begin{pmatrix} y_1 \\ y_2 \\ \cdots \\ y_m \end{pmatrix} \tag{4}$$

From Formula (3), the following residual equation holds:

$$XW=Y+E \tag{5}$$

In this case, prediction coefficients $w_i$ for determining prediction values $E[y]$ that are close to the pixel values y of the HD pixels are determined by minimizing the following squared error:

$$\sum_{i=1}^{m} e_i^2 \tag{6}$$

Therefore, prediction coefficients $w_i$ that satisfy the following equations (derivatives of the above squared error with respect to the prediction coefficients $w_i$ are 0) are optimum values for determining prediction values $E[y]$ close to the pixel values y of the HD pixels.

$$e_1 \frac{\partial e_1}{\partial w_i} + e_2 \frac{\partial e_2}{\partial w_i} + \ldots + e_m \frac{\partial e_m}{\partial w_i} = 0 (i=1, 2, \ldots, n) \tag{7}$$

In view of the above, first, the following equations are obtained by differentiating Formula (5) with respect to prediction coefficients $w_i$.

$$\frac{\partial e_i}{\partial w_1} = x_{i1}, \frac{\partial e_i}{\partial w_2} = x_{i2}, \ldots, \frac{\partial e_i}{\partial w_n} = x_{in}, (i=1, 2, \ldots, m) \tag{8}$$

Formula (9) is obtained from Formula (7) and (8).

$$\sum_{i=1}^{m} e_i x_{i1} = 0, \sum_{i=1}^{m} e_i x_{i2} = 0, \ldots \sum_{i=1}^{m} e_i x_{in} = 0 \tag{9}$$

By considering the relationship between the learning data x, the prediction coefficients w, the teacher data y, and the residuals e in the residual equation of Formula (5), the following normal equations can be obtained from Formula (9):

$$\begin{cases} \left(\sum_{i=1}^{m} x_{i1} x_{i1}\right) w_1 + \left(\sum_{i=1}^{m} x_{i1} x_{i2}\right) w_2 + \ldots + \left(\sum_{i=1}^{m} x_{i1} x_{in}\right) w_n = \sum_{i=1}^{m} x_{i1} y_i \\ \left(\sum_{i=1}^{m} x_{i2} x_{i1}\right) w_1 + \left(\sum_{i=1}^{m} x_{i2} x_{i2}\right) w_2 + \ldots + \left(\sum_{i=1}^{m} x_{i2} x_{in}\right) w_n = \sum_{i=1}^{m} x_{i2} y_i \\ \left(\sum_{i=1}^{m} x_{in} x_{i1}\right) w_1 + \left(\sum_{i=1}^{m} xnx_{i2}\right) w_2 + \ldots + \left(\sum_{i=1}^{m} x_{in} x_{in}\right) w_n = \sum_{i=1}^{m} x_{in} y_i \end{cases} \tag{10}$$

The normal equations of Formula (10) can be obtained in the same number as the number of prediction coefficients w to be determined. Therefore, optimum prediction coefficients w can be determined by solving Formula (10) (for Formula (10) to be soluble, the matrix of the coefficients of the prediction coefficients w need to be regular). To solve Formula (10), it is possible to use a sweep-out method (Gauss-Jordan elimination method) or the like.

The adaptive process is a process for determining optimum prediction coefficients w in the above manner and then determining prediction values E[y] that are close to the component signals y according to Formula (1) by using the optimum prediction values w (the adaptive process includes a case of determining prediction coefficients w in advance and determining prediction values by using the prediction coefficients w).

The adaptive process is different from the interpolation process in that components not included in an SD picture but included in an HD picture are reproduced. That is, the adaptive process appears the same as the interpolation process using an interpolation filter, for instance, as long as only Formula (1) is concerned. However, the adaptive process can reproduce components in an HD picture because prediction coefficients w corresponding to tap coefficients of the interpolation filter are determined by what is called learning by using teacher-data y. That is, a high-resolution picture can be obtained easily. From this fact, it can be said that the adaptive process is a process having a function of creating resolution of a picture.

FIG. 9 is an example of a configuration of a picture conversion apparatus which converts an SD picture as a digital signal into an HD picture.

An SD picture is supplied to a delay line 107, and blocking circuits 1 and 2. The SD picture is delayed by, for instance, one frame by the delay line 107 and then supplied to the blocking circuits 1 and 2. Therefore, the blocking circuits 1 and 2 are supplied with an SD picture of a current frame (hereinafter referred to as a subject frame where appropriate) as a subject of conversion into an HD picture and an SD picture of a 1-frame preceding frame (hereinafter referred to as a preceding frame where appropriate).

In the blocking circuit 1 or 2, HD pixels which constitute an HD picture of the subject frame are sequentially employed as the subject pixel and prediction taps or class taps for the subject pixel are formed from the SD pictures of the subject frame and the preceding frame.

It is assumed here that, for example, HD pixels and SD pixels have a relationship as shown in FIG. 10. That is, in this case, one SD pixel (indicated by mark "□", in the figure) corresponds to four HD pixels (indicated by mark "○" in the figure) located at top-left, top-right, bottom-left, and bottom-right positions of the SD pixel and adjacent thereto. Therefore, the SD pixels are pixels obtained by decimating the HD pixels at a rate of one for two in both horizontal and vertical directions.

In the blocking circuit 1 or 2, for example, when some HD pixel is employed as the subject pixel, a block (processing block) of 3×3 pixels (horizontal/vertical) having, as the center, the SD pixel in the subject frame corresponding to the subject pixel (HD pixel) is formed as shown in FIG. 10 and a block of 3×3 pixels having, as the center, the SD pixel in the preceding frame corresponding to the subject pixel is formed as shown in FIG. 11. The 18 pixels (SD pixels) in total are employed as prediction taps or class taps. FIG. 10 shows SD pixels and HD pixels in the subject frame by marks "□" and "○" respectively, and FIG. 11 shows SD pixels and HD pixels in the preceding frame by marks "■" and "●" respectively.

The prediction taps obtained by the blocking circuit 1 are supplied to a prediction operation circuit 6, and the class taps obtained by the blocking circuit 2 are supplied to a class code generation circuit 4 via an ADRC circuit 3.

In the above case, prediction taps and class taps are formed by 3×3 SD pixels having, as the center, the SD pixel in the subject frame corresponding to the subject pixel and 3×3 pixels having, as the center, the SD pixel in the preceding frame corresponding to the subject pixel. Therefore, the same prediction taps and class taps are formed when any of HD pixels a, b, c, and d shown in FIG. 10 is employed as the subject pixel.

The class taps that have been supplied to the class code generation circuit 4 via the ADRC circuit 3 are classified there. That is, the class code generation circuit 4 outputs, as a class of the class taps (or subject pixel), a value corresponding to a pattern of pixel values of the SD pixels (as described above, 18 SD pixels) that constitute the class taps.

Where a large number of bits, for instance, 8 bits, are allocated to represent the pixel value of each SD pixel, the number of patterns of pixel values of 18 SD pixels is enormous, that is, $(2^8)^{18}$, making it difficult to increase the speed of the following process.

In view of the above, for example, an ADRC (adaptive dynamic range coding) process that is a process for decreasing the number of bits of SD pixels constituting class taps is executed on the class taps in the ADRC circuit 3 as a pre-process for the classification.

Specifically, in the ADRC circuit 3, first a pixel having the maximum pixel value (hereinafter referred to as a maximum pixel where appropriate) and a pixel having the minimum pixel value (hereinafter referred to as a minimum pixel where appropriate) among the 18 SD pixels constituting the class taps are detected. The difference DR (=MAX−MIN) between the pixel value MAX of the maximum pixel and the pixel value MIN of the minimum pixel is calculated and employed as a local dynamic range of the processing block. Based on the dynamic range DR, the respective pixel values constituting the processing block are re-quantized into K bits that are smaller than the originally allocated number of bits. That is, the respective pixel values constituting the processing block are subtracted by the pixel value MIN of the minimum pixel and resulting differences are divided by $DR/2^K$.

As a result, the respective pixel values constituting the processing block are expressed by K bits. Therefore, where, for example, K=1, the number of patterns of pixel values of 18 SD pixels become $(2^1)^{18}$, which is much smaller than in the case where the ADRC process is not executed. The ADRC process for causing pixel values to be expressed by K bits will be hereinafter referred to as a K-bit ADRC process, where appropriate.

The class code generation circuit 4 executes a classification process on the class taps that have been subjected to the above ADRC process, whereby a value corresponding to a pattern of the SD pixel values constituting the class taps is supplied to a prediction coefficients memory 5 as a class of the class taps (subject pixel corresponding to it).

The prediction coefficients memory 5 stores, for each class, prediction coefficients that have been determined in advance through learning. When supplied with a class from the class code generation circuit 4, the prediction coefficients memory S reads out prediction coefficients that are stored at an address corresponding to the class and supplies those to the prediction operation circuit 6.

In the prediction operation circuit 6, the operation represented by Formula (1), that is, an adaptive process, is performed by using prediction taps (pixel values of SD pixels constituting the prediction taps) $x_1, x_2, \ldots$ that are supplied from the blocking circuit 2 and prediction coefficients adapted to the prediction taps, that is, prediction coefficients $w_1, w_2, \ldots$ corresponding to the class of the subject pixel that are supplied from the prediction coefficients memory 5. A prediction value E[y] of the subject pixel y is thereby determined and output as a pixel value of the subject pixel (HD pixel).

Thereafter, similar processes are sequentially executed while the other HD pixels of the subject frame are employed as the subject pixel, whereby the SD picture is converted into an HD picture.

FIG. 12 shows an example of a configuration of a learning apparatus which executes a learning process for calculating prediction coefficients to be stored in the prediction coefficients memory 5 shown in FIG. 9.

An HD picture (HD picture for learning) to serve as teacher data y of learning is supplied to a decimation circuit 101 and a teacher data extraction circuit 27. In the decimation circuit 101, the HD pixel is reduced in the number of pixels by decimation and is thereby converted into an SD picture (SD picture for learning). Specifically, since one SD pixel corresponds to four HD pixels adjacent thereto as described above in connection with FIG. 10, for example, in the decimation circuit 101 the HD picture is divided into blocks of 2×2 HD pixels and the average value of those pixels is employed as a pixel value of the SD pixel located at the center of each block of 2×2 HD pixels (i.e., the SD pixel corresponding to the 2×2 HD pixels).

The SD picture obtained by the decimation circuit 101 is supplied to a delay line 128 and blocking circuits 21 and 22.

The delay line 128, the blocking circuits 21 and 22, an ADRC circuit 23, and a class code generation circuit 24 execute the same processes as the blocking circuits 1 and 2, the ADRC circuit 3, and the class code generation circuit 4 shown in FIG. 9, respectively. As a result, the blocking circuit 21 outputs prediction taps that have been formed for the subject pixel and the class code generation circuit 24 outputs a class of the subject pixel.

The class that is output from the class code generation circuit 24 is supplied to respective address terminals (AD) of a prediction taps memory 25 and a teacher data memory 26. The prediction taps that are output from the blocking circuit 21 are supplied to the prediction taps memory 25. The prediction taps memory 25 stores, as learning data, the prediction taps that are supplied from the blocking circuit 21 at an address corresponding to the class that is supplied from the class code generation circuit 24.

On the other hand, a teacher data extraction circuit 27 extracts an HD pixel as the subject pixel from an HD picture supplied thereto, and supplies it to the teacher data memory 26 as teacher data. The teacher data memory 26 stores the teacher data that is supplied from the teacher data extraction circuit 27 at an address corresponding to the class that is supplied from the class code generation circuit 24.

Thereafter, similar processes are executed until all HD pixels constituting the HD picture that is prepared for the learning in advance are employed as the subject pixel.

As a result, SD pixels and an HD pixel that are in the positional relationships described above in connection with FIGS. 10 and 11 are stored, as learning data x and teacher data y, at the same addresses of the prediction taps memory 25 and the teacher data memory 26, respectively.

The prediction taps memory 25 and the teacher data memory 26 can store plural pieces of information at the same address, whereby a plurality of learning data x and a plurality of teacher data y that are classified as the same class can be stored at the same addresses.

Then, an operation circuit 29 reads out, from the prediction taps memory 25 and the teacher data memory 26, pixel values of SD pixels constituting prediction taps as learning data and pixel values of HD pixels as teacher data that are stored at the same addresses, respectively. The operation circuit 29 calculates prediction coefficients that minimize errors between prediction values and the teacher data by a least squares method by using those pixel values. That is, the operation circuit 29 establishes normal equations of Formula (10) for each class and determines prediction coefficients for each class by solving the normal equations.

The prediction coefficients for the respective classes that have been determined by the operation circuit 29 in the above manner are stored in the prediction coefficients memory 5 shown in FIG. 9 at an address corresponding to the class.

Where prediction coefficients obtained by the learning apparatus of FIG. 12 are stored in the prediction coefficients memory 5 of the picture conversion apparatus of FIG. 9 and a conversion from an SD picture to an HD picture is performed, basically the picture quality of a resulting HD picture can be improved by increasing the number of SD pixels constituting class taps and prediction taps.

However, as the number of SD pixels constituting class taps and prediction taps is increased, the SD pixels come to include ones that are distant from the subject pixel spatially or temporally. In such a case, SD pixels having no correlation with the subject pixel come to be included in class taps and prediction taps. Once this situation occurs, it is difficult to improve the picture quality of an HD picture by further adding SD pixels having no correlation to class taps and prediction taps.

OBJECTS OF THE INVENTION

The present invention has been made in view of the above circumstances, and an object of the invention is to make it possible to further improve the picture quality of an HD picture.

SUMMARY OF THE INVENTION

In order to attain the above objects, according to an aspect of the present invention, an apparatus for converting a first picture comprising pixels into a second picture comprising pixels is provided. The second picture is converted by executing on the first picture an adaptive process that determines prediction values of the second picture by using a number of pixel values of the first picture as prediction taps and a number of prediction coefficients that are adapted to the first picture. The apparatus comprises a prediction taps forming circuit for forming a number of prediction taps from the first picture and a third picture obtained by the adaptive process and an executing circuit for executing the adaptive process by using the formed number of prediction taps and a number of prediction coefficients that are adapted to the prediction taps.

The apparatus further comprises a class taps forming circuit for forming a number of class taps from the first picture and the picture obtained by the adaptive process. The apparatus further comprises a classifying circuit for classifying the number of class taps to determine a class. The executing circuit executes the adaptive process by using the formed number of prediction taps and the number of prediction coefficients corresponding to the class.

Further, the execution circuit reads out the number of prediction coefficients from a memory in response to the class and calculating the prediction value of the second picture by using the formed number of prediction taps and the read number of prediction coefficients.

Further, the memory stores a number of prediction coefficients for respective classes.

Further, the number of prediction coefficients for respective classes are generated in advance by using a second learning picture having a quality corresponding to a quality of the second picture.

Further, the number of prediction coefficients for respective classes are chosen so as to minimize an error between the second learning picture and a picture predicted from a first learning picture and the second learning picture.

Further, the number of prediction coefficients for respective classes are selected so as to minimize an error between the second learning picture and a picture predicted from a first learning picture and an adaptive processed second picture, the adaptive processed second picture being obtained by executing the adaptive process on the first learning picture.

BRIEF DESCRIPTION OF THE DRAWINGS

For a more complete understanding of the invention, reference is made to the following description and accompanying drawings, in which:

FIG. 12 is a block diagram showing an example configuration of a learning apparatus which executes a learning process for determining prediction coefficients to be stored in a prediction coefficients memory 5 shown in FIG. 9.

DESCRIPTION OF THE PREFERRED EMBODIMENTS

Figure 1:
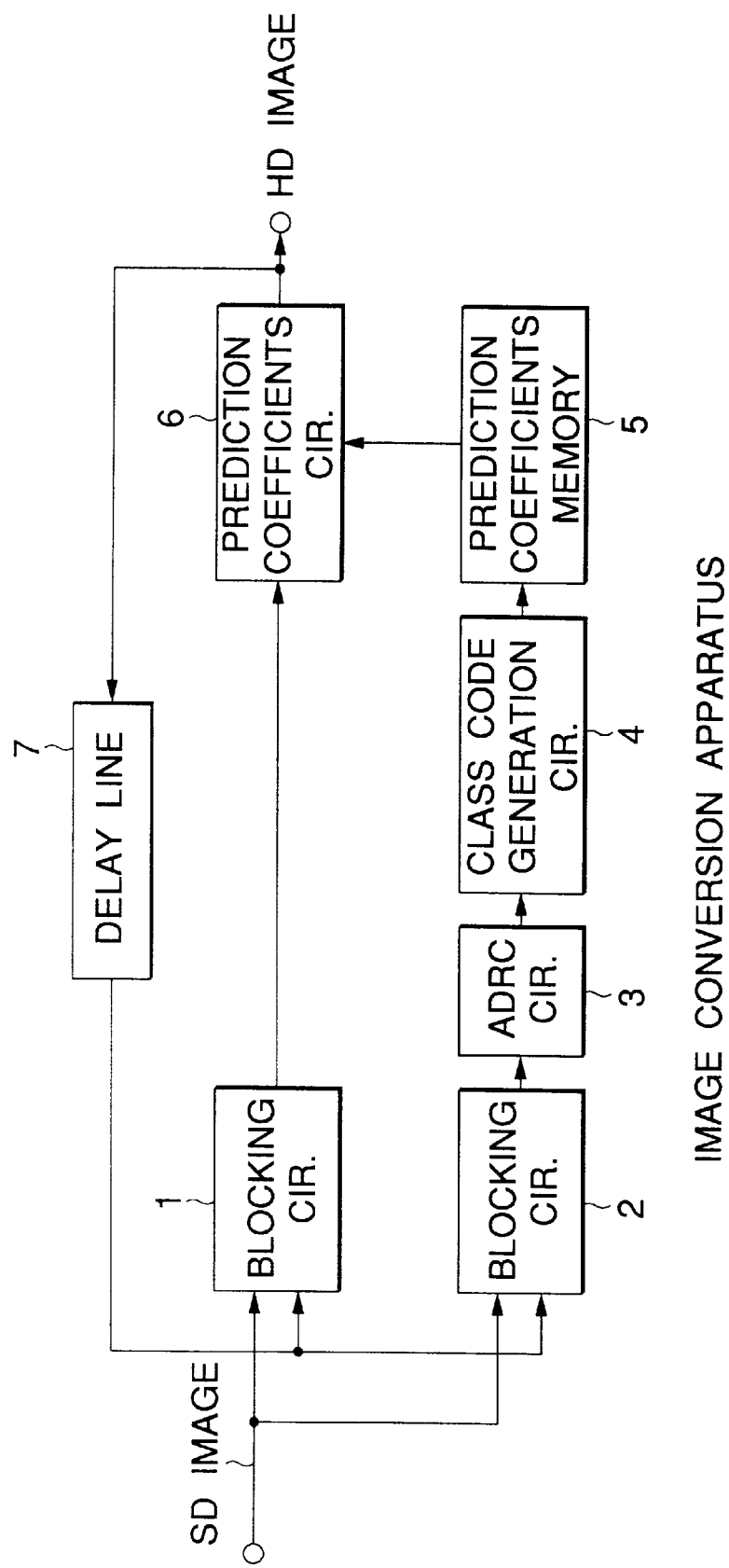
FIG. 1 is a block diagram showing an example configuration of an embodiment of a picture conversion apparatus to which the present invention is applied.
Figure 9:
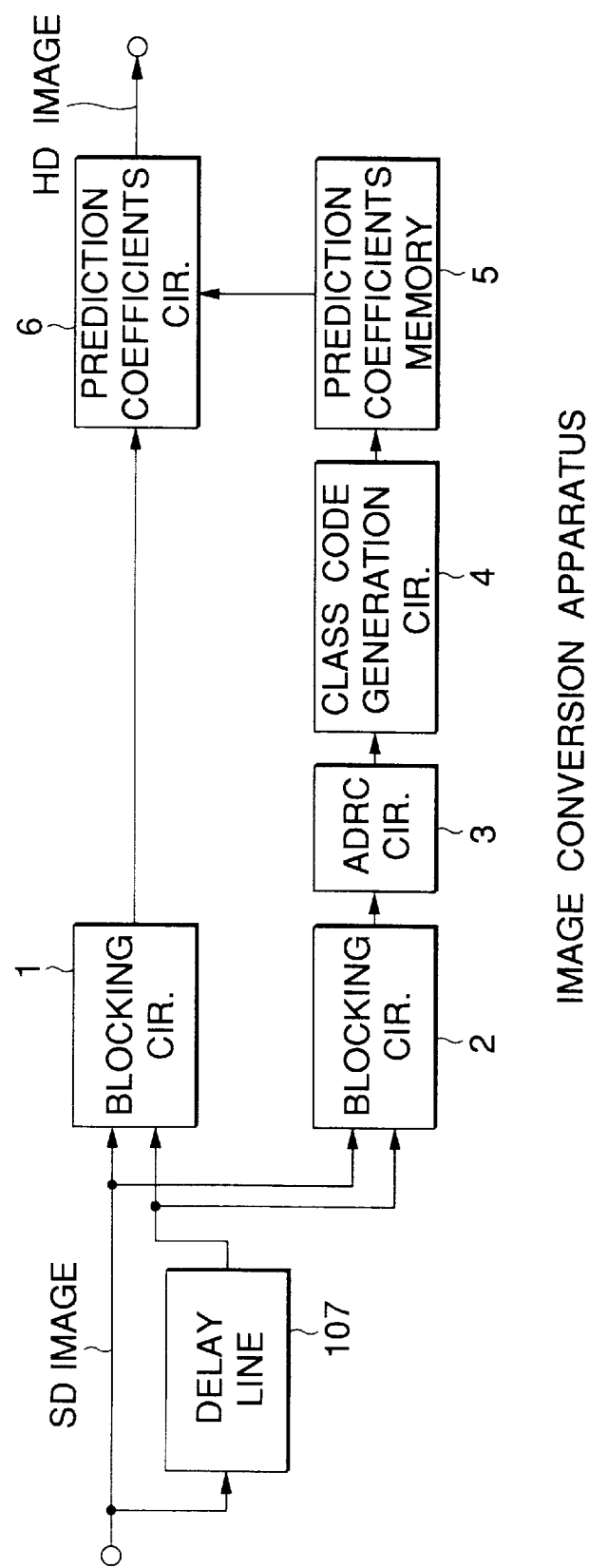
FIG. 9 is a block diagram showing an example configuration of a picture conversion apparatus that was previously proposed by the present applicant.

The embodiments of the present invention will be described below. FIG. 1 shows an example configuration of an embodiment of a picture conversion apparatus to which the present invention is applied. In FIG. 1, components having the corresponding components in FIG. 9 are given the same reference numerals as the latter. That is, this picture conversion apparatus is configured basically in the same manner as the picture conversion apparatus of FIG. 9 except that instead of the delay line 107 a delay line 7 is provided which delays an output picture of the prediction operation circuit 6 and supplies a delayed picture to the blocking circuits 1 and 2.

Figure 2:
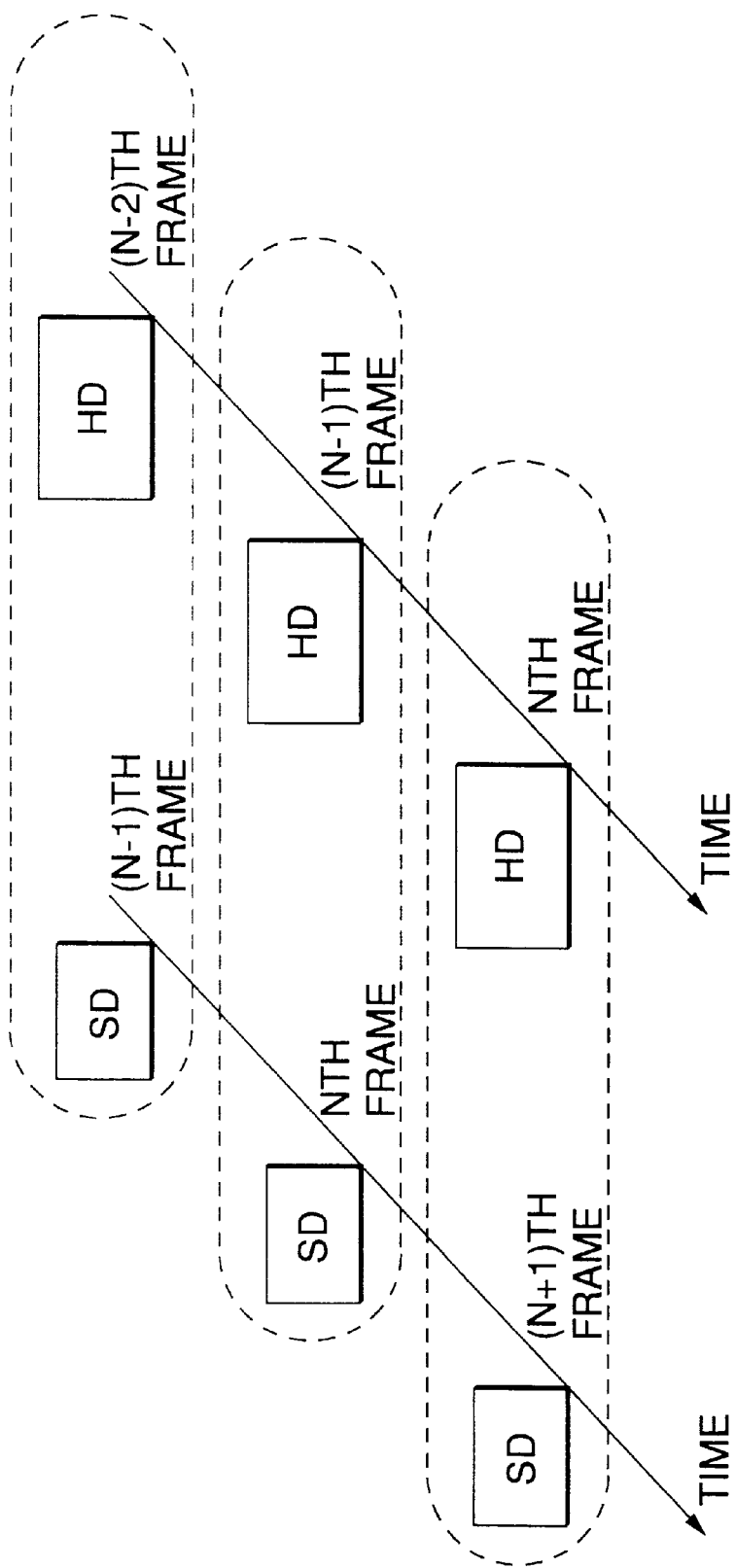
FIG. 2 is a chart showing a frame relationship between an SD picture and an HD picture that are input to blocking circuits 1 and 2 shown in FIG. 1.

The delay line 7 delays an HD picture that is output from the prediction operation circuit 6 by, for instance, one frame and supplies a delayed HD picture to the blocking circuits 1 and 2. Therefore, in the embodiment of FIG. 1, as shown in FIG. 2, at the same time as an SD picture of an Nth frame is supplied to the blocking circuits 1 and 2, an HD picture of an (N−1)th frame (i.e., a frame that precedes the Nth frame by one frame) that has been obtained by an adaptive process is supplied thereto.

In the above-configured picture conversion apparatus, as described above, an SD picture of the subject frame and an HD picture of the preceding frame are supplied to the blocking circuits 1 and 2. That is, in contrast to the configuration of FIG. 9 in which SD picture of the subject frame and the preceding frame are supplied, in this embodiment an HD picture that has already been obtained by the prediction operation circuit 6 through an adaptive process is supplied together with an SD picture of the subject frame.

In the blocking circuit 1 or 2, while HD pixels constituting an HD picture of the subject frame are sequentially employed as the subject pixel, prediction taps or class taps for the subject pixel are formed from an SD picture of the subject frame and an HD picture of the preceding frame.

Figure 3:
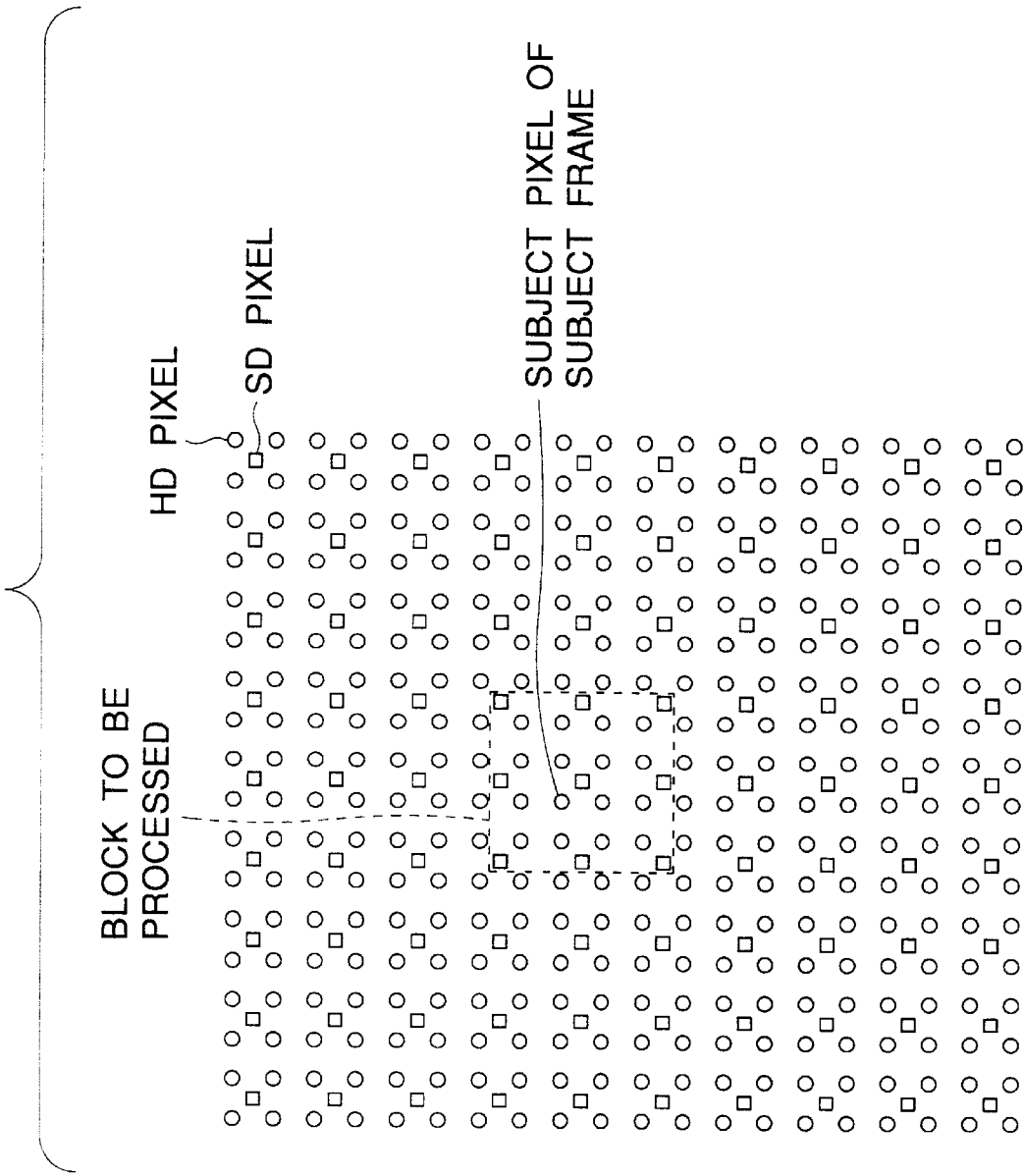
FIG. 3 is a chart showing a relationship between SD pixels and HD pixels.
Figure 10:
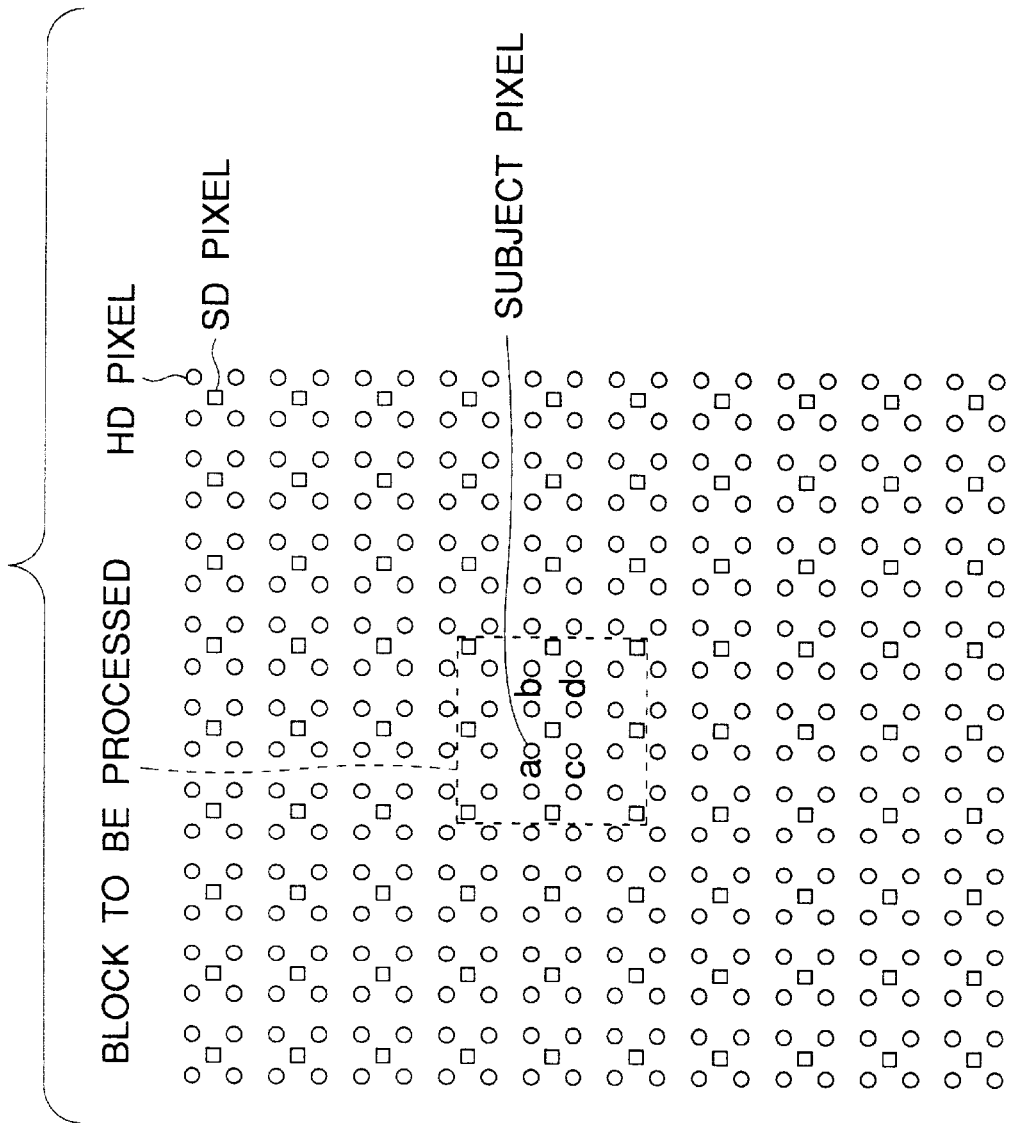
FIG. 10 is a chart for description of processes of blocking circuits 1 and 2 shown in FIG. 9.
Figure 11:
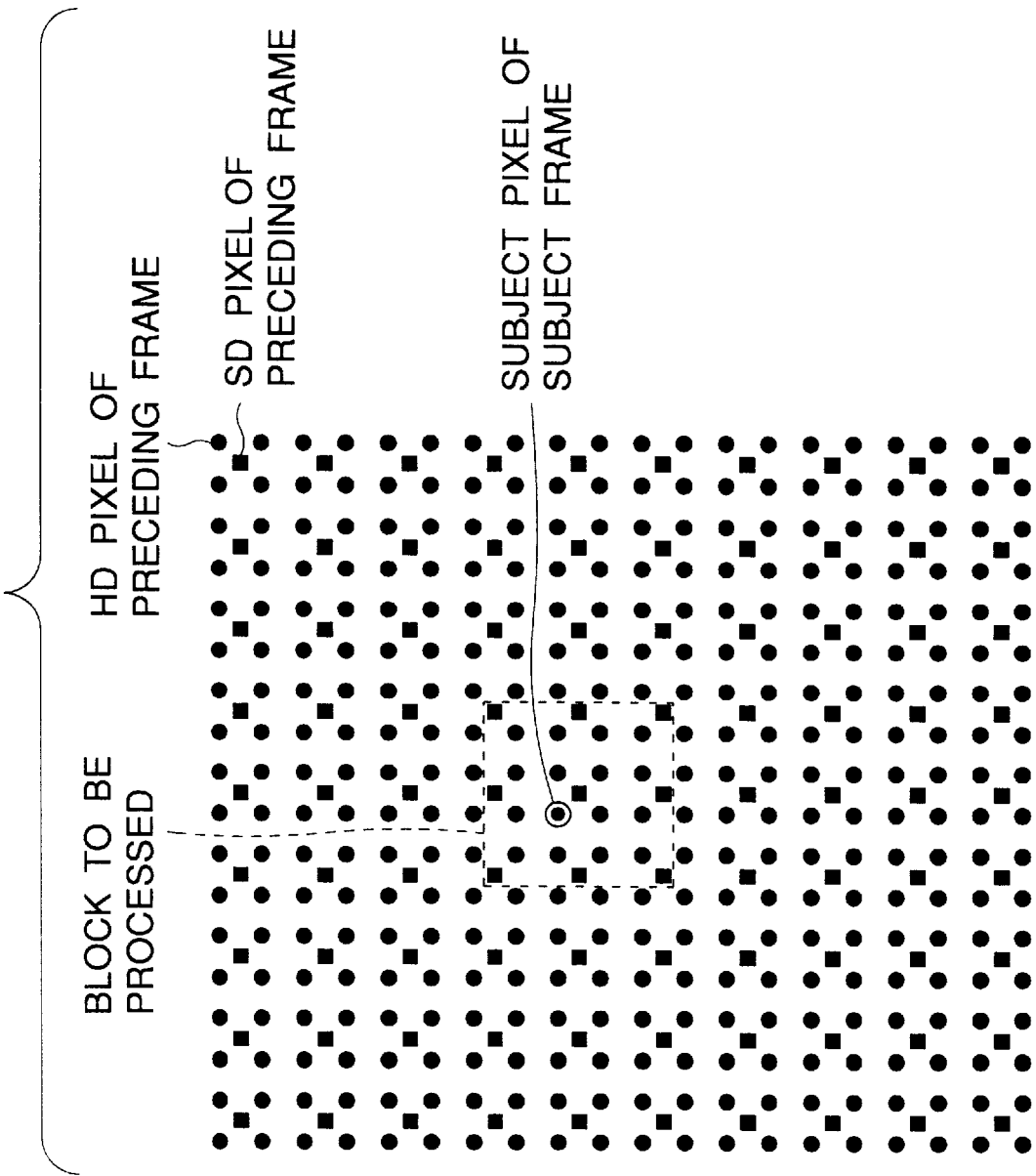
FIG. 11 is a chart for description of the processes of blocking circuits 1 and 2 shown in FIG. 9.

Also in this case, it is assumed that, for example, HD pixels and SD pixels have a relationship as shown in FIG. 3 that is the same as the above-described relationship shown in FIG. 10. That is, in this case, one SD pixel corresponds to four HD pixels located at top-left, top-right, bottom-left, and bottom-right positions of the SD pixel and adjacent thereto. Therefore, the SD pixels are pixels obtained by decimating the HD pixels at a rate of one for two in both the horizontal and vertical directions.

Figure 4:
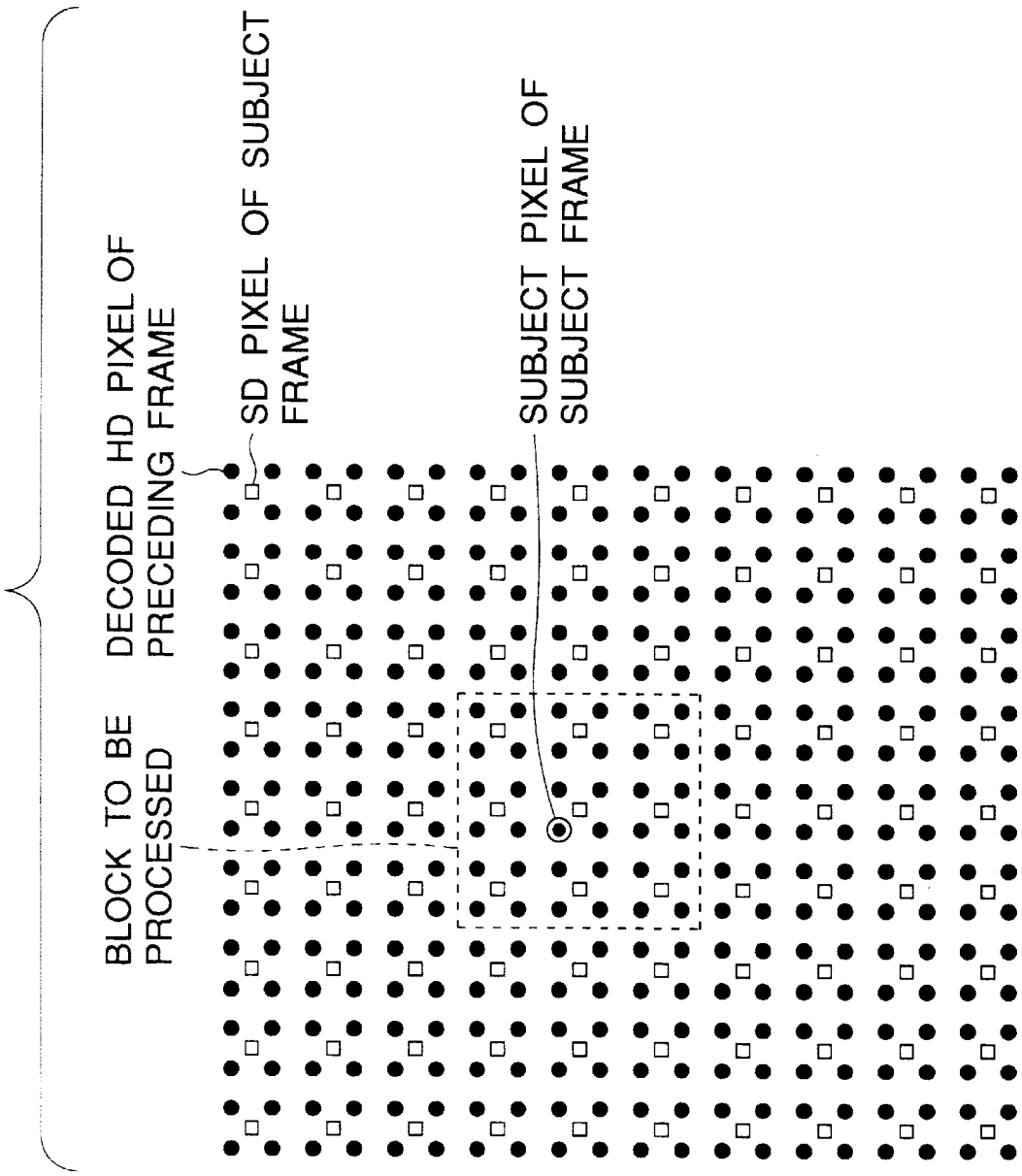
FIG. 4 is a chart for description of processes of the blocking circuits 1 and 2 shown in FIG. 1.

In the blocking circuit 1 or 2, for example, when some HD pixel is employed as the subject pixel, a block (processing block) of 3×3 SD pixels (indicated by mark "□" in FIG. 3) having, as the center, the SD pixel in the subject frame corresponding to the subject pixel (HD pixel) is formed as enclosed by a broken line in FIG. 3, and a block of HD pixels corresponding to 3×3 (=9) respective SD pixels having, as the center, the SD pixel in the preceding frame corresponding to the subject pixel, that is, 6×6 (=36) HD pixels encleosed by a broken line in FIG. 4 (since four HD pixels correspond to one SD pixel, the number of HD pixels corresponding to the 9 respective SD pixels is 4×=36; indicated by mark "●" in FIG. 4) is formed. The 45 pixels (9 SD pixels and 36 HD pixels) in total are employed as prediction taps or class taps.

Like FIG. 10, FIG. 3 shows SD pixels and HD pixels in the subject frame by marks "□" and "○" respectively. FIG. 4 shows SD pixels in the subject frame and HD pixels in the preceding frame by marks "■" and "●" respectively.

The prediction taps obtained by the blocking circuit 1 are supplied to the prediction operation circuit 6, and the class taps obtained by the blocking circuit 2 are supplied to the ADRC circuit 3.

In the above case, to simplify the description, prediction taps and class taps are formed by the same SD pixels and HD pixels for a certain subject pixel. However, it is not always necessary to form those kinds of taps by the same SD pixels and HD pixels. That is, the number of prediction taps can be changed to the number of class taps.

Although in the above case prediction taps and class taps are formed by 3×3 SD pixels in a square region in the subject frame and 6×6 HD pixels in a square region in the preceding frame, they can be formed by SD pixels and HD pixels in a region having some other shape such as a rectangle, a cruciform or a rhombus. It is even possible to use pixels constituting an SD picture and an HD picture of a frame that precedes the preceding frame by one frame or a frame that succeeds the subject frame by one frame.

It is preferable to form prediction taps and class taps by SD pixels and HD pixels having strong correlations with the subject pixel. Therefore, basically it is preferable to use SD pixels and HD pixels that are close to the subject pixel spatially and/or temporally.

In the above case, prediction taps and class taps are formed by 3×3 SD pixels having, as the center, the SD pixel in the subject frame corresponding to the subject pixel and a total of 36 HD pixels corresponding to 3×3 respective SD pixels having, as the center, the SD pixel in the preceding frame corresponding to the subject pixel. Therefore, as described above in connection with FIG. 10, the same prediction taps and class taps are formed when any of four HD pixels corresponding to some SD pixel is employed as the subject pixel (it is possible to form different prediction taps and class taps).

The ADRC circuit 3 executes, for instance, a 1-bit ADRC process on class taps that are supplied from the blocking circuit 2, and resulting class taps are supplied to the class code generation circuit 4. The class code generation circuit 4 outputs, as a class of those class taps (or the subject pixel), a value corresponding to a pattern of pixel values of SD pixels and HD pixels constituting the class taps.

The class that is output from the class code generation circuit 4 is supplied to the prediction coefficients memory 5 as an address.

The prediction coefficients memory 5 stores, for each class, prediction coefficients that have been determined through learning (described later). When supplied with a class from the class code generation circuit 4, the prediction coefficients memory 5 reads out prediction coefficients that are stored at an address corresponding to the class and supplies those to the prediction operation circuit 6. Specifically, where prediction taps are constituted of m SD pixels $x_1, x_2, \ldots, x_m$ and n HD pixels $y_1, Y_2, y_n$ (in this embodiment, m=9 and n=36), the prediction coefficients memory 5 stores prediction coefficients $w_{x1}, w_{x2}, \ldots, w_{xm}$ to be multiplied by the respective SD pixels $x_1, x_2, \ldots, x_m$ and prediction coefficients $w_{y1}, w_{y2}, \ldots, w_{yn}$ to be multiplied by the respective HD pixels $y_1, y_2, \ldots, y_n$. The prediction coefficients memory 5 supplies the prediction operation circuit 6 with prediction coefficients $w_{x1}, w_{x2}, \ldots, w_{xm}$ and $w_{y1}, w_{y2}, \ldots, w_{yn}$ that are stored at an address corresponding to the class that is supplied from the class code generation circuit 4.

The prediction operation circuit 6 performs an operation of Formula (11) that corresponds to Formula (1), that is, an adaptive process by using prediction taps (i.e., pixel values of SD pixels and HD pixels constituting prediction taps) $x_1, x_2, \ldots, x_m$ and $y_1, y_2, \ldots, y_n$ and prediction coefficients adapted to the prediction taps, that is, prediction coefficients $w_{x1}, w_{x2}, \ldots, w_{xm}$ and $w_{y1}, w_{y2}, \ldots, w_{yn}$ that are supplied from the prediction coefficients memory 5 and correspond to the class of the subject pixel. As a result, a prediction value E[z] is determined and output as a pixel value of the subject pixel (HD pixel).

$$E[z] = w_{x1}x_1 + w_{x2}x_2 + \cdots + w_{xm}x_m + \qquad (11)$$
$$w_{y1}y_1 + w_{y2}y_2 + \cdots + w_{yn}y_n$$

That is, while in the case of FIG. 9 the adaptive process is executed by using only SD pixels, in this embodiment the adaptive process is executed by using also HD pixels (in this case, HD pixels constituting an HD picture of the preceding frame that has been obtained by the previously executed adaptive process).

Now, the adaptive process that was described above by using Formulae (1)–(7) are extended so as to use not only SD pixels but also HD pixels.

For example, now we consider a case of determining a prediction value E[z] of a pixel value z of an HD pixel of the subject frame by using a linear first-order combination model that is prescribed by a linear combination of pixel values $x_1, x_2, \ldots, x_m$ of several SD pixels of the subject frame and pixel values $y_1, y_2, \ldots, y_n$ of several HD pixels of the preceding frame and prediction coefficients $w_{x1}, w_{x2}, \ldots, w_{xm}$ and $w_{y1}, w_{y2}, \ldots, w_{yn}$. In this case, the prediction value E[z] of the pixel value z is expressed by the above Formula (11).

Now, k HD pixels $z_1, z_2, \ldots, z_k$ of the subject frame are prepared for learning of prediction coefficients $w_{x1}, w_{x2}, \ldots, w_{xm}$ and $w_{y1}, w_{y2}, \ldots, w_{yn}$. Where each of the k HD pixels are employed as the subject pixel, k sets of SD pixels $x_1, x_2, \ldots, x_m$ of the subject frame and HD pixels $y_1, y_2, \ldots, y_n$ of the preceding frame that constitute prediction taps are prepared.

When an HD pixel $z_j$ of the subject frame is employed as the subject pixel, a set of SD pixels of the subject frame and HD pixels of the preceding frame that constitute prediction taps are expressed as $x_{j1}, x_{j2}, \ldots, x_{jm}$ and $y_{j1}, y_{j2}, \ldots, y_{jn}$, respectively. In this case, Formula (12) holds.

$$E[z_j] = w_{x1}x_{j1} + w_{x2}x_{j2} + \cdots + w_{xm}x_{jm} + \qquad (12)$$
$$w_{y1}y_{j1} + w_{y2}y_{j2} + \cdots + w_{yn}y_{jn}$$

where $j = 1, 2, \ldots, k$.

Now, with an assumption that $k \geq m+n$ (for normal equations of Formula (18) (described later) to be soluble, the number k of data used in the learning should be m+n or more), we consider a case of determining a prediction value E[zj] that is close to the true value $z_j$ from Formula (12) (or Formula (11)) by a least squares method.

In this case, an error $e_j$ of a prediction value E[zj] with respect to the true value zj is expressed by the following formula.

$$e_j = z_j - e[z_j] \qquad (13)$$
$$= z_j - (w_{x1}x_{j1} + w_{x2}x_{j2} + \cdots + w_{xm}x_{jm} +$$
$$w_{y1}y_{j1} + w_{y2}y_{j2} + \cdots + w_{yn}y_{jn})$$

Therefore, if prediction coefficients $w_{x1}, w_{x2}, \ldots, w_{xm}$ and $w_{y1}, w_{y2}, \ldots, w_{yn}$ that minimize Formula (14) are obtained, they are a set of prediction coefficients that minimizes a squared error $E^2$ of prediction values E [zj] with respect to the true values $z_j$.

$$E^2 = \sum_{j=1}^{k} \{e_j\}^2 \tag{14}$$

That is, prediction coefficients w that zero derivatives of the squared error $E^2$ that is expressed by Formula (14) with respect to the prediction coefficients w are optimum values for determining a prediction value E[z] that is close to the pixel value z of the HD pixel.

In view of the above, partially differentiating Formula (14) with respect to the prediction coefficients $w_{xi}$ (i=1, 2, ..., m) and $w_{yi}$ (i=1, 2, ..., n), we obtain Formulae (15) and (16), respectively.

$$\frac{\partial E^2}{\partial W_{xi}} = \sum_{j=1}^{k} 2\left(\frac{\partial e_j}{\partial w_{xi}}\right) e_j = \sum_{j=1}^{k} 2 x_{ji} \cdot e_j \tag{15}$$

$$\frac{\partial E^2}{\partial W_{xi}} = \sum_{j=1}^{k} 2\left(\frac{\partial e_j}{\partial w_{yi}}\right) e_j = \sum_{j=1}^{k} 2 y_{ji} \cdot e_j \tag{16}$$

Since prediction coefficients $w_{xi}$ and $w_{yi}$ that make Formula (15) and (16) zero should be determined, normal equations of Formula (18) are obtained by defining $X_{ji}, Y_{ji},$ and $Z_i$ as Formula (17).

$$X_{ji} = \sum_{p=1}^{k} x_{pi} \cdot x_{pj} \tag{17}$$

$$X_{ji} = \sum_{p=1}^{k} x_{pi} \cdot x_{pj}$$

$$Z_i = \sum_{p=1}^{k} x_{ij} \cdot y_j$$

$$\begin{bmatrix} X_{11} & X_{12} & \cdots & X_{1m} & Y_{11} & Y_{12} & \cdots & Y_{1n} \\ X_{21} & X_{22} & \cdots & X_{2m} & Y_{21} & Y_{22} & \cdots & Y_{2n} \\ \cdots & \cdots & \cdots & \cdots & & & & \\ X_{k1} & X_{k2} & \cdots & X_{km} & Y_{k1} & Y_{k2} & \cdots & Y_{kn} \end{bmatrix} \begin{bmatrix} W_{x1} \\ W_{x2} \\ \vdots \\ W_{xn} \\ W_{y1} \\ \vdots \\ W_{yn} \end{bmatrix} = \begin{bmatrix} Z_1 \\ Z_2 \\ \vdots \\ \vdots \\ \vdots \\ Z_k \end{bmatrix} \tag{18}$$

The normal equations of Formula (18) can be solved by using, for instance, a sweep-out method as in the case of solving the above-described Formula (10).

Prediction coefficients $w_{x1}, w_{x2}, \ldots, w_{xm}$ and $w_{y1}, w_{y2}, \ldots, w_{yn}$ that have been obtained by establishing the normal equations of Formula (18) for each class are stored in the prediction coefficients memory 5. The prediction operation circuit 6 determined a prediction value E[z] close to the true value z by performing the operation of Formula (11) using prediction coefficients $w_{x1}, w_{x2}, \ldots, w_{xm}$ and $w_{y1}, w_{y2}, \ldots, w_{yn}$ corresponding to the class of the subject pixel and SD pixels $x_1, x_2, \ldots, x_m$ and HD pixels $y_1, y_2, \ldots, y_n$ constituting prediction taps that have been formed for the subject pixel.

Similar processes are sequentially executed while the other HD pixels of the subject frame are employed as the subject pixel, whereby the SD pixels are converted into HD pixels.

Since as described above class taps and prediction taps are formed by using not only SD pixels but also HD pixels, the class taps and the prediction taps can include many pixels that are close to the subject pixel spatially and/or temporally. Further, since HD pixels in which high-frequency components have been restored through the adaptive process are used in forming class taps and prediction taps, the quality of a resulting HD picture can be improved as compared to the case of forming class taps and prediction taps using only SD pixels.

Formulas (15) and (16) correspond to the above-described Formula (8) and Formula (18) corresponds to the above-described Formula (10). Formula (15) and (16) are formula extended from Formula (8) in that Formula (16) is newly introduced. Formula (18) is a formula extended from Formula (10) in that the portions enclosed by broken lines in Formula (15) are added.

In the embodiment of FIG. 1, no HD picture has been output from the prediction operation circuit 6 at a time point when an SD picture of the first frame is input. At this time point, the blocking circuits 1 and 2 executes processes using, for instance, predetermined initial values or indefinite values instead of an HD picture from the prediction operation circuit 6.

Figure 5:
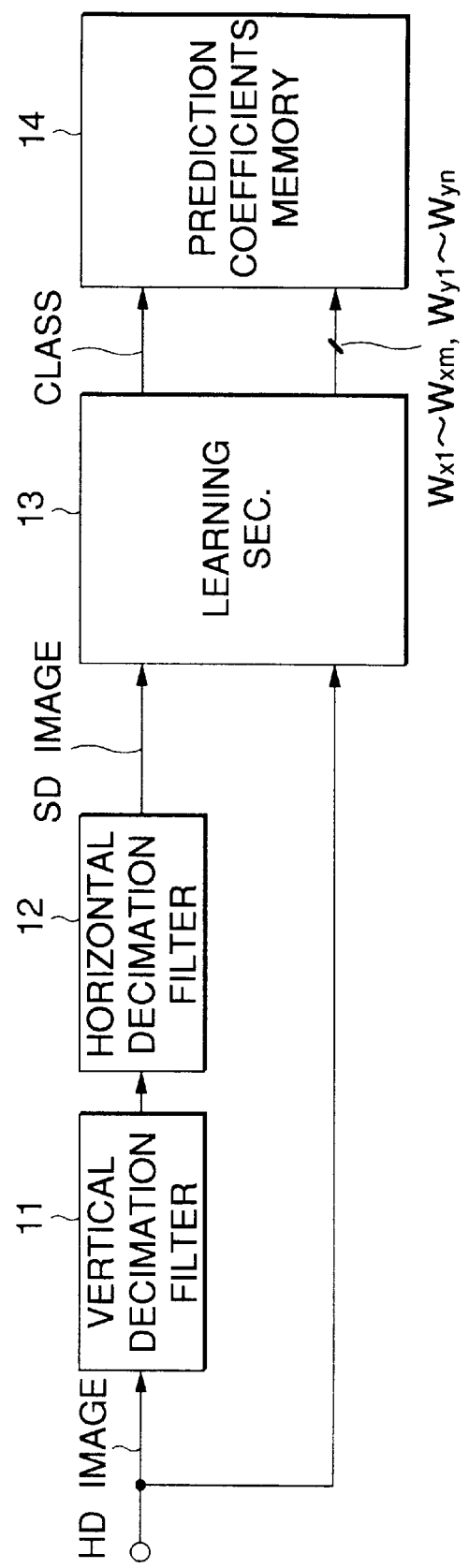
FIG. 5 is a block diagram showing an example configuration of a first embodiment of a learning apparatus to which the present invention is applied.

FIG. 5 shows an example configuration of a first embodiment of a learning apparatus which executes a learning process for calculating prediction coefficients for each class to be stored in the prediction coefficients memory 5 shown in FIG. 1.

A HD picture of a digital signal (HD signal for learning) to become teacher data z in learning is supplied to vertical decimation filter 11 and a learning section 13. In the vertical decimation circuit 11, the number of pixels of the HD pixels for learning is, for instance, halved in the vertical direction and a resulting picture is supplied to a horizontal decimation filter 12. In the horizontal decimation filter 12, the number of pixels of the output of the vertical decimation filter 12 is, for instance, halved in the horizontal direction. As a result, an SD picture for learning that is constituted of SD pixels indicated by mark "□" in FIG. 3 is formed from the HD picture for learning that is constituted of HD pixels indicated by mark "○" in FIG. 3. Specifically, for example, the vertical decimation filter 11 and the horizontal decimation filter 12 equivalently execute a process that average values are calculated for the HD picture for learning in units of 2×2 HD pixels and employed as a pixel value of an SD pixel located at the center of each set of 2×2 HD pixels.

The SD picture that is output from the horizontal decimation filter 12 is supplied to the learning section 13.

The learning section 13 determines, for each class, prediction coefficients that decrease errors of a picture obtained by a linear combination of the prediction coefficients and the SD picture and the HD picture for learning that are input to the learning section 13 with respect to the HD picture for learning by establishing and solving normal equations of the above Formula (18). The prediction coefficients for the respective classes are supplied to a prediction coefficients memory 14 together with the classes. The prediction coefficients memory 14 stores the prediction coefficients supplied from the learning section 13 at respective addresses corresponding to the classes also supplied from the learning section 13. As a result, the prediction coefficients for the respective classes are stored in the prediction coefficients memory 14.

Figure 6:
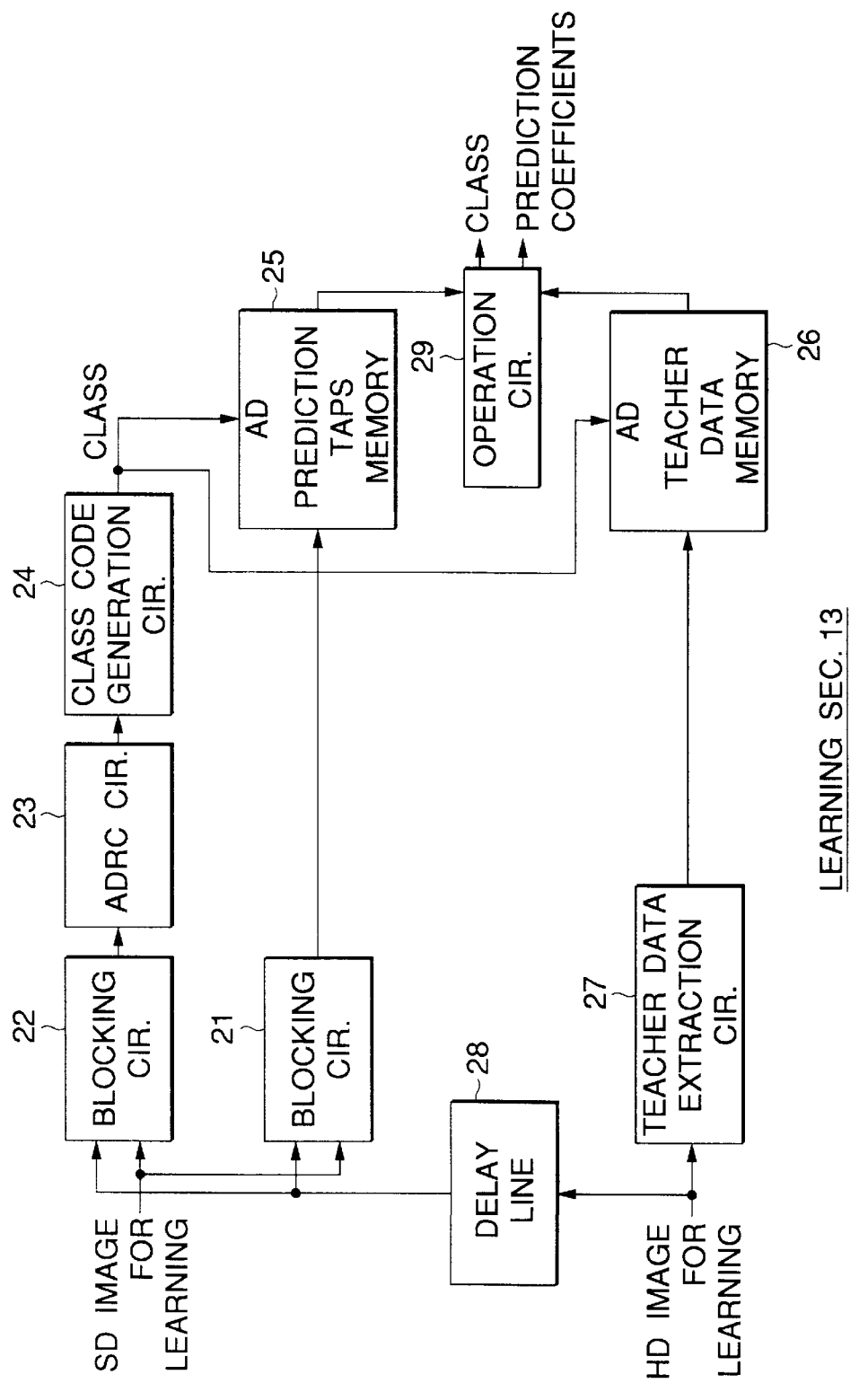
FIG. 6 is a block diagram showing an example configuration of a learning section 13 shown in FIG. 5.

FIG. 6 shows an example configuration of the learning section 13 shown in FIG. 5. In FIG. 6, components having the corresponding components in the learning apparatus of FIG. 12 are given the same reference numerals as the latter. That is, the learning section 13 is configured basically in the same manner as the learning apparatus of FIG. 12 except that the decimation circuit 101 is not provided and a delay line 28 is provided instead of the delay line 128.

An SD picture for learning is supplied to the blocking circuits 21 and 22 and an HD picture for learning is supplied to the teacher data extraction circuit 27 and the delay line 28. The delay line 28 delays the received HD picture by, for instance, a time corresponding to one frame and supplies a delayed HD picture to the blocking circuits 21 and 22. Therefore, the blocking circuits 21 and 22 are supplied with both of an SD picture of the subject frame and an HD picture of the preceding frame.

The blocking circuits 21 and 22, the ADRC circuit 23, and the class code generation circuit 24 execute the same processes as the blocking circuits 1 and 2, the ADRC circuit 3, and the class code generation circuit 4 shown in FIG. 9, respectively. As a result, the blocking circuit 21 outputs prediction taps that have been formed for the subject pixel and the class code generation circuit 24 outputs a class of the subject pixel.

The class that is output from the class code generation circuit 24 is supplied to respective address terminals (AD) of the prediction taps memory 25 and the teacher data memory 26. The prediction taps that are output from the blocking circuit 21 are supplied to the prediction taps memory 25. The prediction taps memory 25 stores, as learning data, the prediction taps that are supplied from the blocking circuit 21 at an address corresponding to the class that is supplied from the class code generation circuit 24.

On the other hand, the teacher data extraction circuit 27 extracts an HD pixel as the subject pixel from an HD picture supplied thereto, and supplies it to the teacher data memory 26 as teacher data. The teacher data memory 26 stores the teacher data that is supplied from the teacher data extraction circuit 27 at an address corresponding to the class that is supplied from the class code generation circuit 24.

Thereafter, similar processes are executed until all HD pixels constituting the HD picture that is prepared for the learning in advance are employed as the subject pixel.

As a result, SD pixels and HD pixels that are in the positional relationships described above in connection with FIGS. 3 and 4 with the subject pixel (i.e., SD pixels and HD pixels constituting prediction taps) when the HD pixel that is stored at an address the teacher data memory 26 is employed as the subject pixel (i.e., SD pixels and HD pixels constituting prediction taps) are stored, as learning data x, at the same address of the prediction taps memory 25 as the address of the teacher data memory 26.

Then, an operation circuit 29 reads out, from the prediction taps memory 25 and the teacher data memory 26, SD pixels and HD pixels constituting prediction taps as learning data and HD pixels as teacher data that are stored at the same addresses, respectively. The operation circuit 29 calculates prediction coefficients that minimize errors between prediction values and the teacher data by a least squares method by using those pixels. That is, the operation circuit 29 establishes normal equations of Formula (18) for each class and determines prediction coefficients for each class by solving the normal equations.

The prediction coefficients for the respective classes that have been determined by the operation circuit 29 in the above manner are stored in the prediction coefficients memory 14 (see FIG. 5) together with the classes.

In the above learning process, there may occur a class with which normal equations are not obtained in a number necessary for determining prediction coefficients. For such a class, for example, prediction coefficients that are obtained by establishing normal equations by disregarding classes and solving those may be employed as what is called default prediction coefficients.

While in the case of FIG. 5 HD pixels constituting an HD picture for learning are used not only as HD pixels to be used as teacher data but also as HD pixels to be used as learning data, HD pixels to used as learning data may be generated from SD pixels for learning.

Figure 7:
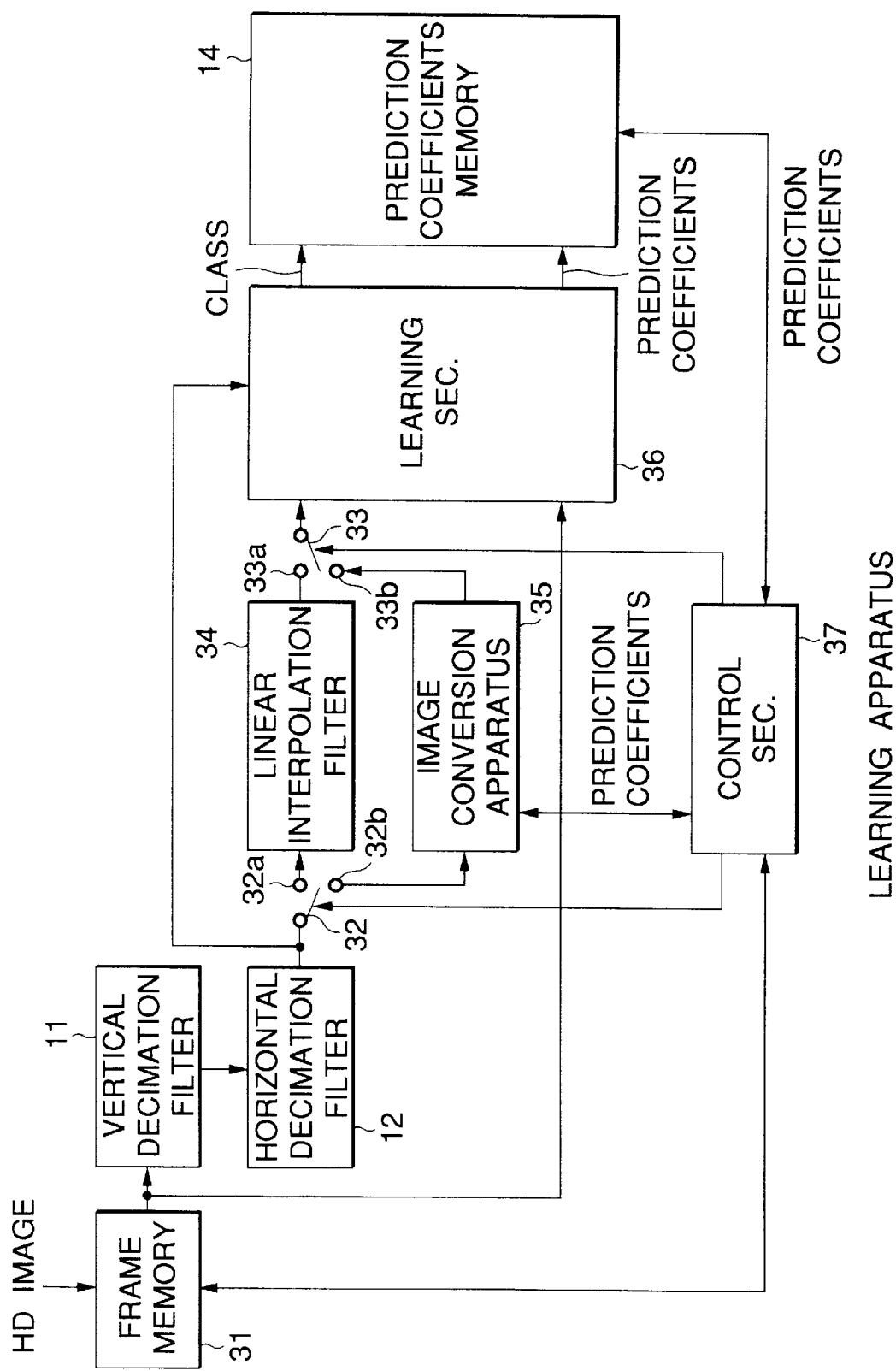
FIG. 7 is a block diagram showing an example configuration of a second embodiment of a learning apparatus to which the present invention is applied.

FIG. 7 shows an example configuration of a second embodiment of a learning apparatus. In FIG. 7, components having the corresponding components in the learning apparatus of FIG. 5 are given the same reference numerals as the latter.

An HD picture for learning are supplied to a frame memory 31 capable of storing an HD picture of one frame or more and stored there. HD picture write and read operations on the frame memory 31 are controlled by a control section 37. The frame memory 31 stores an HD picture for learning and reads out a stored HD picture for learning under the control of the control section 37.

An HD picture that has been read out from the frame memory 31 is supplied to the vertical decimation filter 11 and a learning section 36. The vertical decimation filter 11 and the horizontal decimation filter 12 that is provided downstream of it generate an SD picture for learning from the HD picture for learning in the same manner as described above in connection with FIG. 5, and supply those to a switch 32 and the learning section 36.

The switch 32 selects one of terminals 32a and 32b under the control of the control section 37. Specifically, the switch 32 selects the terminal 32a when the HD picture that is stored in the frame memory 31 is read out first. Therefore, in this case, an SD picture for learning is supplied to a linear interpolation filter 34 via the switch 32 and the terminal 32a. The linear interpolation filter 34 generates a picture having the same number of pixels as the HD picture for learning from the SD picture for learning by, for instance, executing a linear interpolation process on the SD picture for learning. Unlike the adaptive process, the linear interpolation process that is executed in the linear interpolation filter 34 cannot reproduce high-frequency components that are included in the original picture (in this case, the HD picture for learning). The picture having the same number of pixels as the HD picture for learning, that is output from the linear interpolation filter 34 will be hereinafter referred to as an interpolation HD picture, where appropriate.

The interpolation HD picture that is output from the linear interpolation filter 34 is supplied to a terminal 33a. The control section 37 controls the switches 32 and 33 so that the switch 33 selects the terminal 33a when the switch 32 selects the terminal 32a and that the switch 33 selects the terminal 33b when the switch 32 selects the terminal 32b. Therefore, in the case being considered, since the switch 33 selects the terminal 33a, the interpolation HD picture is supplied to the learning section 36.

The learning section 36 determines, for each class, prediction coefficients that decrease errors of a picture obtained by a linear combination of the prediction coefficients with respect to the HD picture for learning that is supplied from the frame memory 31 by establishing and solving normal equations of the above Formula (18) using the SD picture for learning that is supplied from the horizontal decimation filter 12 and the interpolation HD picture that is supplied from the linear interpolation filter 34. The prediction coefficients for the respective classes are supplied to the prediction coefficients memory 14 together with the classes and stored there.

When the prediction coefficients for the respective classes have been stored in the prediction coefficients memory 14, the control section 37 reads out those prediction coefficients and supplies those to a picture conversion apparatus 35. Configured in the same manner as the picture conversion apparatus of FIG. 1 or 9, the picture conversion apparatus 35 stores the prediction coefficients for the respective classes that are supplied from the control section 37 in the prediction coefficients memory 5. When the HD picture is read out first from the frame memory 31, no prediction coefficients are stored in the picture conversion apparatus 35 and hence an adaptive process cannot be executed. Therefore, when the HD picture is read out first from the frame memory 31, an interpolation HD picture is generated by the linear interpolation filter 34 and the learning section 36 determines prediction coefficients using the interpolation HD picture.

Thereafter, the control section 37 controls the frame memory 31 so as to start a second read operation for reading out the HD picture for learning stored therein. In the second and following read operations for reading out the HD picture stored therein, the control section 37 controls the switches 32 and 33 so that they select the terminals 32b and 33b, respectively.

As a result, the HD picture that has been read out from the frame memory 31 is not only supplied to the learning section 36 but also supplied to it, after being converted into an SD picture for learning, via the vertical decimation filter 11 and the horizontal decimation filter 12.

In this case, furthermore the SD picture for learning that is output via the vertical decimation filter 11 and horizontal decimation filter 12 is not only supplied to the learning section 36 but also supplied to the picture conversion apparatus 35 via the switch 32 that is selecting the terminal 32b. The picture conversion circuit 35 executes an adaptive process on the SD picture for learning by using that prediction coefficients for the respective classes that have been set in the prediction coefficients memory 5 by the control section 37, and thereby generates a picture having the same number of pixels as the HD picture for learning.

The picture generated by the picture conversion apparatus 35 is supplied to the terminal 33b and hence supplied to the learning section 36 via the switch 33 that is selecting the terminal 33b.

The learning section 36 determines, for each class, prediction coefficients that decrease errors of a picture obtained by a linear combination of the prediction coefficients with respect to the HD picture for learning that is supplied from the frame memory 31 by establishing and solving normal equations of the above Formula (18) using the SD picture for learning that is supplied from the horizontal decimation filter 12 and the picture that is supplied from the picture conversion apparatus 35.

Therefore, in the second and following read operations for reading the HD picture from the frame memory 31, prediction coefficients for the respective classes are learned by using, as learning data, instead of a linear HD picture, a picture (hereinafter referred to as an adaptive process picture where appropriate) that has the same number of pixels as the HD picture for learning and is obtained by an adaptive process executed on an SD picture for learning in the picture conversion apparatus 35.

The prediction coefficients for the respective classes that have been obtained by the learning section 36 are supplied to the prediction coefficients memory 14 together with the classes and stored there (they overwrite the previously stored prediction coefficients for the respective classes).

When prediction coefficients for the respective classes have been stored in the prediction coefficients memory 14, as described above the control section 37 reads out those prediction coefficients for the respective classes, and supplies and stores those to and in the picture conversion apparatus 35 that is configured in the same manner as the picture conversion apparatus of FIG. 1 or 9. Further, the control section 37 controls the frame memory 31 so as to start reading out the HD picture for learning stored therein. Similar processes are repeated thereafter.

When the number of repetition times of operations for reading the HD picture stored in the frame memory 31 has reached a predetermined number or the error of an adaptive process picture that is output from the picture conversion apparatus 35 with respect to the HD picture stored in the frame memory 31 has become smaller than or equal to a predetermined value, the control section 37 finishes the processes of the respective components constituting the apparatus with a judgment that prediction coefficients suitable for converting an SD picture to an HD picture have been stored. For example, if it is found that a picture similar to the HD picture for learning has been obtained, by an operator who visually checks adaptive process pictures obtained by the picture conversion apparatus 35, the processes may be finished manually.

Figure 8:
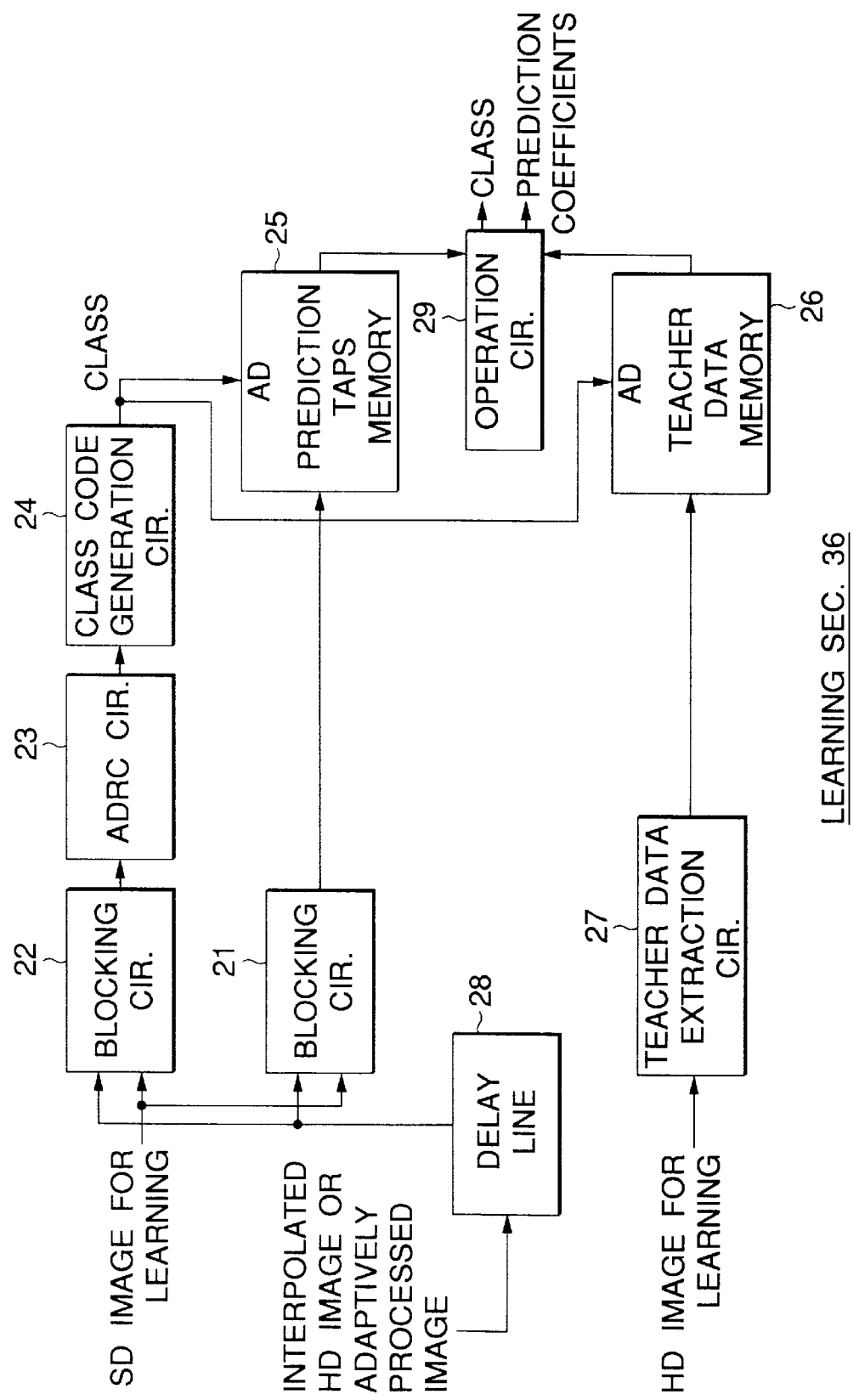
FIG. 8 is a block diagram showing an example configuration of a learning section 36 shown in FIG. 7.

FIG. 8 shows an example configuration of the learning section 36 shown in FIG. 7. In FIG. 8, components having the corresponding components in the learning section 13 shown in FIG. 5 are given the same reference numerals as the latter. That is, the learning section 36 is configured in the same manner as the learning section 13 of FIG. 6 except that the delay line 28 is supplied with an interpolation HD picture that is output from the linear interpolation filter 34 or an adaptive process picture that is output from the picture conversion apparatus 35 rather than an HD picture for learning.

Therefore, in the learning section 36, when an HD picture is first read out from the frame memory 31 (see FIG. 7), the blocking circuits 21 and 22 form prediction taps and class taps, respectively, from an SD picture for learning and an interpolation HD picture. When the HD picture is read out from the frame memory 31 at a second or later time, the blocking circuits 21 and 22 form prediction taps and class taps, respectively, from an SD picture for learning and an adaptive process picture. The learning section 36 determines prediction coefficients for the respective classes in the same manner as the learning section 13 of FIG. 6 except for the above operations.

In a simulation that was conducted by the present inventor, prediction coefficients capable of producing an HD picture of better picture quality were obtained by the learning apparatus of FIG. 5 than by the learning apparatus of FIG. 7.

The picture conversion apparatus and the learning apparatuses to which the present invention is applied have been described above. This type of picture conversion apparatus can be applied, in addition to the case of converting an SD picture into an HD picture, to any cases of converting a picture having a small number of pixels to a picture having a large number of pixels such as a case of an interlace-scanned picture into what is called a progressive picture, and a case of enlarging a picture, and a case of a NTSC format to PAL format. Also, this type of picture conversion apparatus can be applied to any format conversion regardless of converting a picture having a small number of pixels to a picture having a large number of pixels.

Although in the above embodiments the processes are executed on a frame-by-frame basis, they may be executed in different manners, for instance, on a field-by-field basis.

The invention can be applied to both of a moving picture and a still picture.

Although in the above embodiments an HD picture of a frame preceding the subject frame by one frame is used to form prediction taps and class taps, an HD picture of some other frame may be used such as the subject frame or a frame succeeding the subject frame by one frame. However, in the latter cases, for example, it becomes necessary to provide two systems of picture conversion apparatuses of FIG. 1 or providing a delay line for time adjustment upstream of or downstream (at the front stage or the back stage) of the picture conversion apparatus.

Similarly, an SD picture of a frame preceding or succeeding the subject frame by one frame can be used in addition to the subject frame to form prediction taps and class taps.

The relationships between SD pixels and HD pixels are not limited to the ones shown in FIG. 3. The present invention may be represented as a program that can be executed on a general computer.

In the picture conversion apparatus and the picture conversion method to which the present invention is applied, prediction taps are formed from a first picture and a picture obtained by an adaptive process, and the adaptive process is executed by using the prediction taps and prediction coefficients that are adapted to the prediction taps. Therefore, a picture having better picture quality can be obtained.

In the learning apparatus and the learning method to which the present invention is applied, a first picture for learning is generated by decreasing the number of pixels of a second picture for learning. And then prediction coefficients that decrease an error, with respect to the second picture for learning, of a picture obtained by a linear combination of the first and second pictures for learning and the prediction coefficients, are determined. Therefore, prediction coefficients for obtaining a picture having better picture quality can be obtained.

In the learning apparatus and the learning method to which the present invention is applied, a first picture for learning is generated by decreasing the number of pixels of a second picture for learning, and an adaptive process picture is output by executing an adaptive process on the first picture for learning. Then, prediction coefficients that decrease an error, with respect to the second picture for learning, of a picture obtained by a linear combination of the first picture for learning and the adaptive process picture and the prediction coefficients, are determined. Further, the adaptive process for determining an adaptive process picture is again executed by using the thus-determined prediction coefficients. Therefore, prediction coefficients for determining an adaptive process picture having better picture quality can be obtained.

Having now fully described the invention, it will be apparent to one of ordinary skill in the art that many changes and modifications can be made thereto without departing from the spirit and scope of the invention as set forth herein.

What is claimed is:

1. An apparatus for converting a first picture comprising pixels into a second picture comprising pixels, the second picture being converted by executing on the first picture an adaptive process that determines prediction values of the second picture by using a number of pixel values of the first picture as prediction taps and a number of prediction coefficients that are adapted to the first picture, said apparatus comprising:

a prediction taps forming circuit for forming a number of prediction taps from the first picture and a picture obtained by the adaptive process; and an executing circuit for executing the adaptive process by using the formed number of prediction taps and a number of prediction coefficients that are adapted to the prediction taps.

2. An apparatus according to claim 1, further comprising:

a class taps forming circuit for forming a number of class taps from the first picture and the picture obtained by the adaptive process; and a classifying circuit for classifying the number of class taps to determine a class;

wherein the executing circuit executes the adaptive process by using the formed number of prediction taps and the number of prediction coefficients corresponding to the class.

3. An apparatus according to claim 2, wherein the executing circuit reads out the number of prediction coefficients from a memory in response to the class and calculating the prediction value of the second picture by using the formed number of prediction taps and the read number of prediction coefficients, the memory storing a number of prediction coefficients for respective classes.

4. An apparatus according to claim 3, wherein the number of prediction coefficients for respective classes are generated in advance by using a second learning picture having a quality corresponding to a quality of the second picture.

5. An apparatus according to claim 4, wherein the number of prediction coefficients for respective classes are chosen so as to minimize an error between the second learning picture and a picture predicted from a first learning picture and the second learning picture.

6. An apparatus according to claim 4, wherein the number of prediction coefficients for respective classes are selected so as to minimize an error between the second learning picture and a picture predicted from a first learning picture and an adaptive processed second picture, the adaptive processed second picture being obtained by executing the adaptive process on the first learning picture.

7. An apparatus for converting a first picture comprising pixels into a second picture comprising pixels, the second picture being converted by executing on the first picture an adaptive process that determines prediction values of the second picture by using a number of pixel values of the first picture as prediction taps and a number of prediction coefficients that are adapted to the first picture, said apparatus comprising:

a class taps forming circuit for forming a number of class taps from the first picture and a picture obtained by the adaptive process;

a classifying circuit for classifying the number of class taps to determine a class;

a prediction taps forming circuit for forming a number of prediction taps from the first picture; and an execution circuit for executing the adaptive process by using the formed number of prediction taps and a number of prediction coefficients corresponding to the class.

8. An apparatus according to claim 7, wherein the execution circuit reads out the number of prediction coefficients from a memory in response to the class and calculating the prediction value of the second picture by using the formed number of prediction taps and the read number of prediction coefficients, the memory storing a number of prediction coefficients for respective classes.

9. A method for converting a first picture comprising pixels into a second picture comprising pixels, the second picture being converted by executing on the first picture an adaptive process that determines prediction values of the second picture by using a number of pixel values of the first picture as prediction taps and a number of prediction coefficients that are adapted to the first picture, said method comprising the steps of:

forming a number of prediction taps from the first picture and a picture obtained by the adaptive process; and executing the adaptive process by using the formed number of prediction taps and a number of prediction coefficients that are adapted to the prediction taps.

10. A method according to claim 9, further comprising the steps of:

forming a number of class taps from the first picture and the picture obtained by the adaptive process; and classifying the number of class taps to determine a class;

wherein the step of executing the adaptive process executes the adaptive process by using the formed number of prediction taps and the number of prediction coefficients corresponding to the class.

11. A method according to claim 10, wherein the step of executing the adaptive process further comprises the steps of reading out the number of prediction coefficients from a memory in response to the class and calculating the prediction value of the second picture by using the formed number of prediction taps and the read number of prediction coefficients, the memory storing a number of prediction coefficients for respective classes.

12. A method according to claim 11, wherein the number of prediction coefficients for respective classes are generated by using a second learning picture having a quality corresponding to a quality of the second picture.

13. A method according to claim 12, wherein the number of prediction coefficients for respective classes are those so as to minimize an error between the second learning picture and a picture predicted from a first learning picture and the second learning picture.

14. A method according to claim 12, wherein the number of prediction coefficients for respective classes are selected so as to minimize an error between the second learning picture and a picture predicted from a first learning picture and an adaptive processed second picture, the adaptive processed second picture being obtained by executing the adaptive process on the first learning picture.

15. A method for converting a first picture comprising pixels into a second picture comprising pixels, the second picture being converted by executing on the first picture an adaptive process that determines prediction values of the second picture by using a number of pixel values of the first picture as prediction taps and a number of prediction coefficients that are adapted to the first picture, said method comprising the steps of:

forming a number of class taps from the first picture and a picture obtained by the adaptive process;

classifying the number of class taps to determine a class;

forming a number of prediction taps from the first picture; and executing the adaptive process by using the formed number of prediction taps and a number of prediction coefficients corresponding to the class.

16. A method according to claim 15, wherein the step of executing the adaptive process reads out the number of prediction coefficients from a memory in response to the class and further comprising the step of calculating the prediction value of the second picture by using the formed number of prediction taps and the read number of prediction coefficients, the memory storing a number of prediction coefficients for respective classes.

17. An apparatus for converting a first picture comprising pixels into a second picture comprising pixels, the second picture being converted by executing on the first picture an adaptive process that determines prediction values of the second picture by using a number of pixel values of the first picture as prediction taps and a number of prediction coefficients that are adapted to the first picture, said apparatus comprising:

means for forming a number of prediction taps from the first picture and a picture obtained by the adaptive process; and means for executing the adaptive process by using the formed number of prediction taps and a number of prediction coefficients that are adapted to the prediction taps.

18. An apparatus according to claim 17, further comprising:

means for forming a number of class taps from the first picture and a picture obtained by the adaptive process; and means for classifying the number of class taps to determine a class;

wherein the executing means executes the adaptive process by using the formed number of prediction taps and the number of prediction coefficients corresponding to the class.

19. An apparatus according to claim 18, wherein the executing means reads out the number of prediction coefficients from a memory in response to the class and calculating the prediction value of the second picture by using the formed number of prediction taps and the read number of prediction coefficients, the memory storing a number of prediction coefficients for respective classes.

20. An apparatus according to claim 19, wherein the number of prediction coefficients for respective classes are generated in advance by using a second learning picture having a quality corresponding to a quality of the second picture.

21. An apparatus according to claim 20, wherein the number of prediction coefficients for respective classes are those so as to minimize an error between the second learning picture and a picture predicted from a first learning picture and the second learning picture.

22. An apparatus according to claim 20, wherein the number of prediction coefficients for respective classes are selected so as to minimize an error between the second learning picture and a picture predicted from a first learning picture and a adaptive processed second picture, the adaptive processed second picture being obtained by executing the adaptive process on the first learning picture.

23. An apparatus for converting a first picture comprising pixels into a second picture comprising pixels, the second picture being converted by executing on the first picture an adaptive process that determines prediction values of the second picture by using a number of pixel values of the first picture as prediction taps and a number of prediction coefficients that are adapted to the first picture, said method comprising the steps of:

means for forming a number of class taps from the first picture and a picture obtained by the adaptive process;

means for classifying the number of class taps to determine a class;

means for forming a number of prediction taps from the first picture; and means for executing the adaptive process by using the formed number of prediction taps and a number of prediction coefficients corresponding to the class.

24. An apparatus according to claim 23, wherein the executing means reads out the number of prediction coefficients from a memory in response to the class and calculating the prediction value of the second picture by using the formed number of prediction taps and the read number of prediction coefficients, the memory storing a number of prediction coefficients for respective classes.

* * * * *